United States Patent
Nagoaka Mihara

(10) Patent No.: US 8,201,890 B1
(45) Date of Patent: Jun. 19, 2012

(54) ADJUSTABLE SEAT SYSTEM

(76) Inventor: Naoki Nagoaka Mihara, Oakville (CA)

(*) Notice: Subject to any disclaimer, the term of this patent is extended or adjusted under 35 U.S.C. 154(b) by 287 days.

(21) Appl. No.: 12/621,958

(22) Filed: Nov. 19, 2009

(51) Int. Cl.
 *A47C 7/50* (2006.01)
(52) U.S. Cl. ............ 297/423.1; 297/423.15; 297/423.11
(58) Field of Classification Search ............... 297/423.1, 297/423.11, 423.12, 423.15, 466, 330, 112, 297/313, 338
See application file for complete search history.

(56) References Cited

U.S. PATENT DOCUMENTS

| | | | |
|---|---|---|---|
| 2,481,970 A * | 9/1949 | Bell | 297/423.15 |
| 2,528,995 A * | 11/1950 | Bell | 297/354.1 |
| 2,583,223 A * | 1/1952 | Mayer | 297/423.15 |
| 2,602,490 A * | 7/1952 | Earl | 297/423.15 |
| 2,860,691 A * | 11/1958 | Caesar | 297/322 |
| 3,761,124 A * | 9/1973 | Weik et al. | 297/112 |
| 3,936,093 A * | 2/1976 | Hogan | 297/423.15 |
| 4,440,439 A * | 4/1984 | Szabo | 297/62 |
| D281,471 S | 11/1985 | Sauter | |
| 5,312,155 A * | 5/1994 | Akima et al. | 297/180.13 |
| 5,316,370 A * | 5/1994 | Newman | 297/313 |
| 5,567,006 A | 10/1996 | McCarthy | |
| 5,788,326 A | 8/1998 | Kawade et al. | |
| 6,375,266 B1 * | 4/2002 | Ferguson et al. | 297/423.15 |
| 6,578,915 B2 | 6/2003 | Jonas et al. | |
| 6,702,383 B2 * | 3/2004 | Newman et al. | 297/313 |
| 6,811,225 B1 * | 11/2004 | Konya et al. | 297/423.13 |
| 6,945,606 B2 | 9/2005 | Ponticelli | |
| 7,021,713 B2 * | 4/2006 | Kao et al. | 297/339 |
| 7,063,386 B2 | 6/2006 | Dowty et al. | |
| 7,988,235 B2 * | 8/2011 | Clough | 297/423.15 |
| 2001/0035673 A1 | 11/2001 | Lepaule | |
| 2005/0017559 A1 | 1/2005 | Kao et al. | |
| 2005/0029850 A1 | 2/2005 | Ponticelli | |
| 2007/0018494 A1 | 1/2007 | Gutosky, Jr. | |
| 2009/0322139 A1 * | 12/2009 | Clough | 297/423.15 |

FOREIGN PATENT DOCUMENTS

FR 2576256 * 7/1986

* cited by examiner

*Primary Examiner* — David Dunn
*Assistant Examiner* — Erika Garrett

(57) ABSTRACT

An adjustable seat system includes a pair of chairs aligned with each other so that a front side of one chair faces a backside of another of the chairs. Each of the chairs includes a seat having a plurality of legs. The seat includes a pair of lateral walls and a seat cushion positioned between the lateral walls. The seat cushion has a rear edge and a front edge. A backrest is attached to the seat. A drive mechanism is mechanically coupled to the seat cushion. The drive mechanism is actuated in a first direction to lift the rear edge upwardly or actuated in a second direction to lower the rear edge downwardly to an approximately horizontal orientation. A seat control is electrically coupled to the drive mechanism and is actuated to selectively actuate the drive mechanism in a first direction or a second direction.

4 Claims, 6 Drawing Sheets

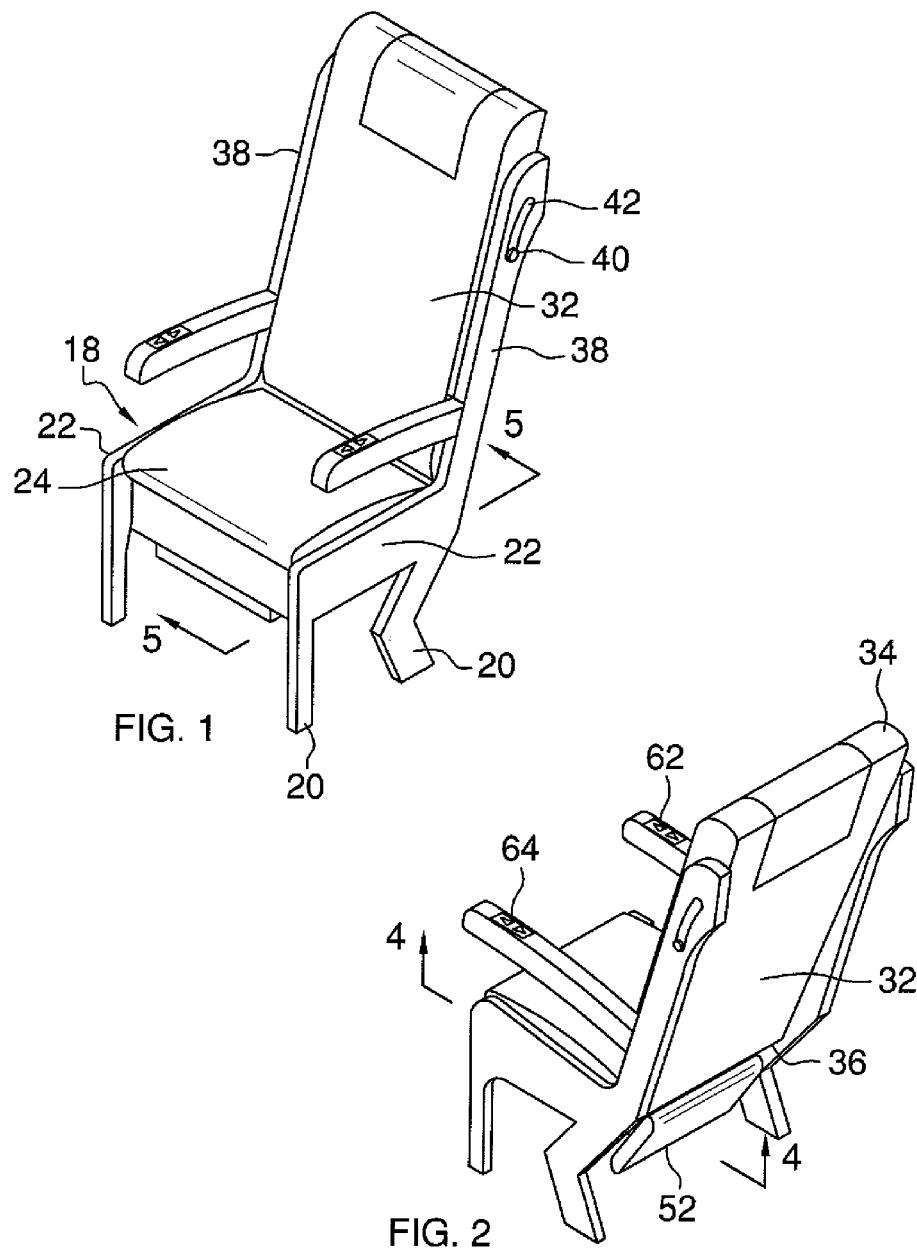

ADJUSTABLE SEAT SYSTEM

BACKGROUND OF THE DISCLOSURE

1. Field of the Disclosure

The disclosure relates to adjustable seating devices and more particularly pertains to a new adjustable seating device for allowing a person to adjust the seat to reduce back strain related to being seated for long periods of time.

2. Summary of the Disclosure

An embodiment of the disclosure meets the needs presented above by generally comprising a pair of chairs that are aligned with each other so that a front side of one chair faces a backside of another of the chairs. Each of the chairs includes a seat that has a plurality of legs attached thereto and extending downwardly therefrom. The seat includes a pair of lateral walls and a seat cushion is positioned between the lateral walls. The seat cushion has a rear edge and a front edge. A backrest is attached to the seat. A drive mechanism is mounted to the seat and is mechanically coupled to the seat cushion. The drive mechanism is actuated in a first direction to lift the rear edge upwardly with respect to the lateral walls. The drive mechanism is actuated in a second direction to lower the rear edge downwardly to an approximately horizontal orientation. A seat control is electrically coupled to the drive mechanism and is actuated to selectively actuate the drive mechanism in a first direction or a second direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a front perspective view of an adjustable seat system according to an embodiment of the disclosure.

FIG. 2 is a rear perspective view of an embodiment of the disclosure.

DESCRIPTION OF THE PREFERRED EMBODIMENT

Figure 3:
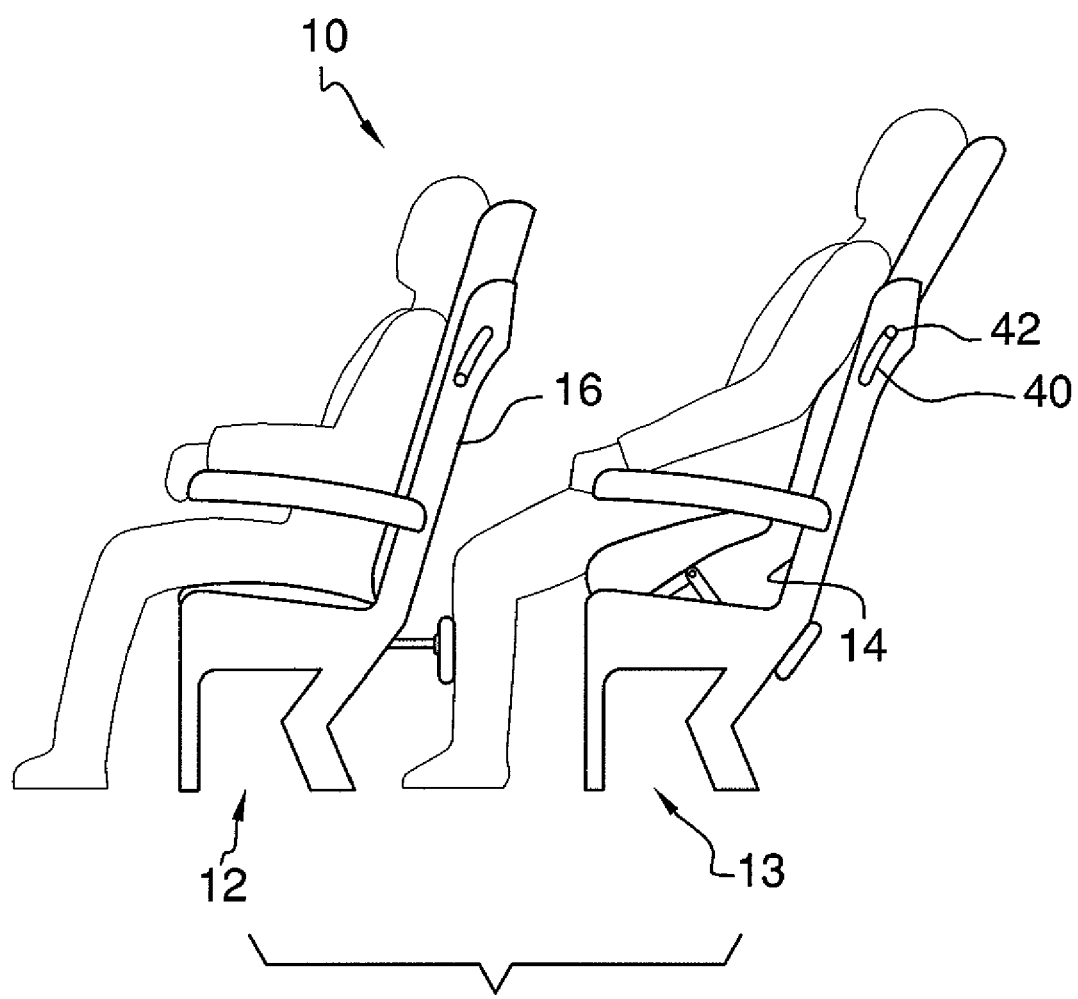
FIG. 3 is a side view of an embodiment of the disclosure.
Figure 4:
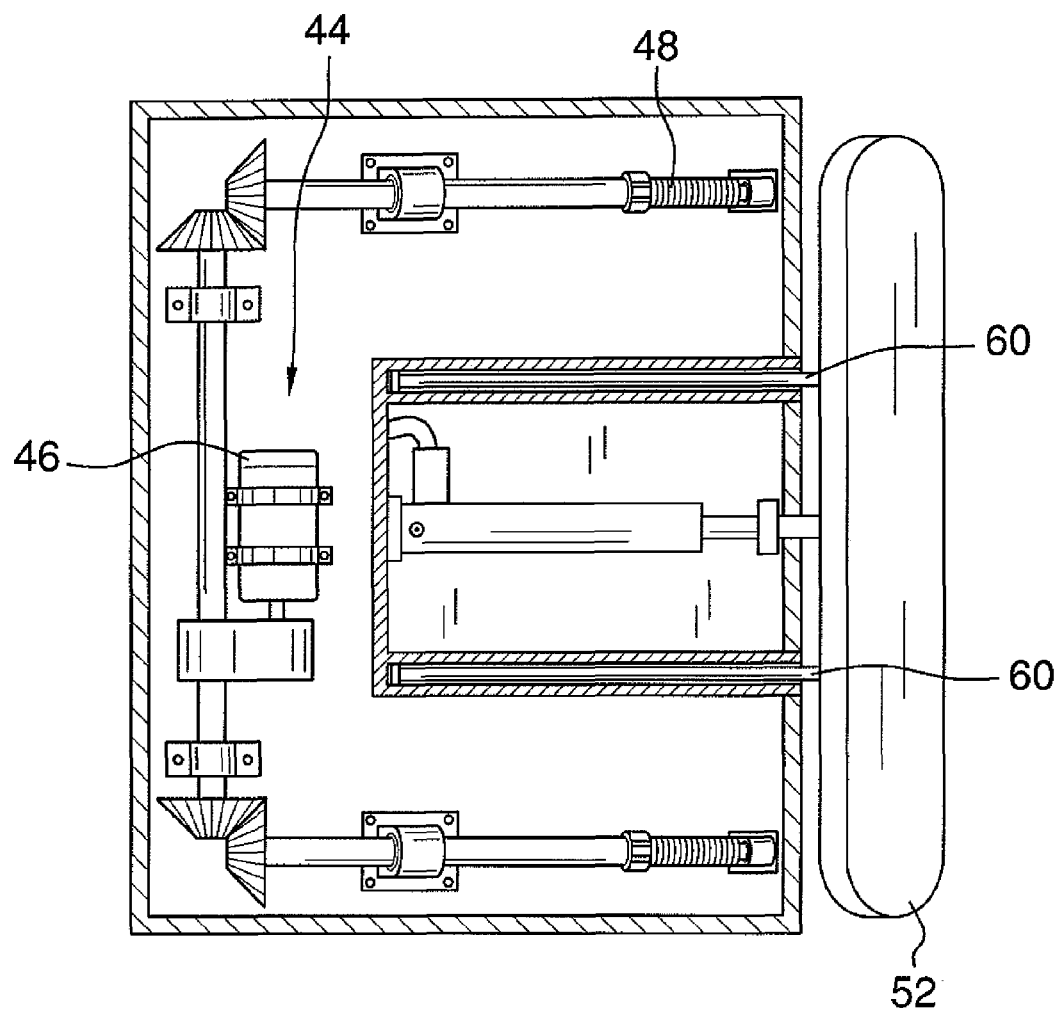
FIG. 4 is a cross-sectional view taken along line 4-4 of FIG. 2 of an embodiment of the disclosure.
Figure 5A:
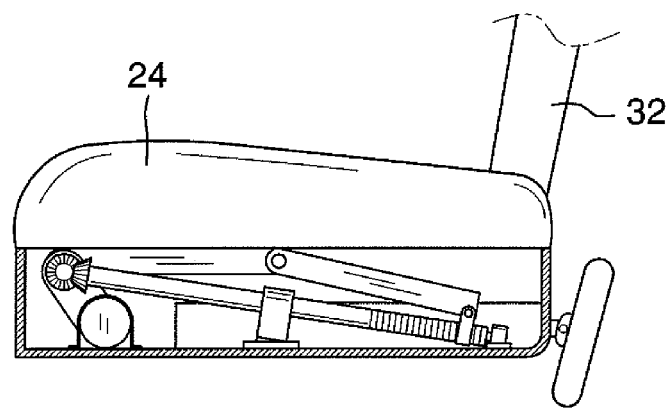
FIG. 5a is a cross-sectional view taken along line 5-5 of FIG. 1 of an embodiment of the disclosure.
Figure 5B:
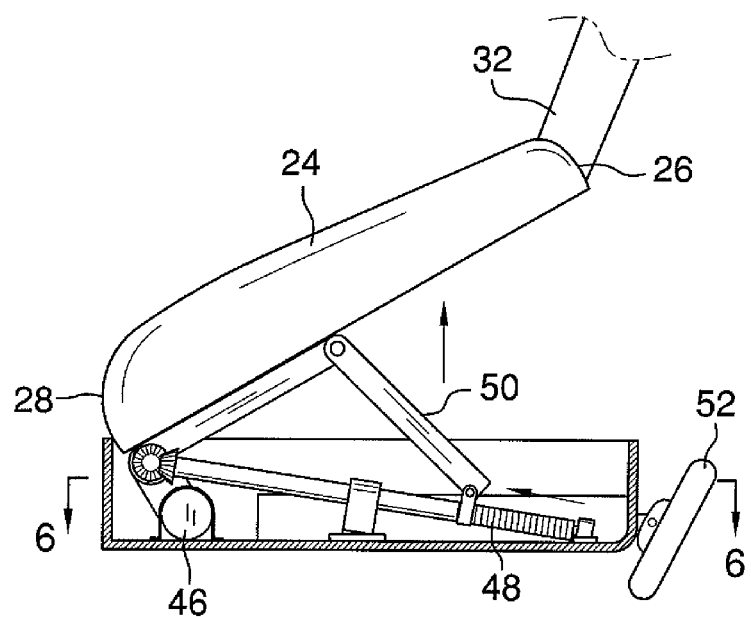
FIG. 5b is a cross-sectional view of an embodiment of the disclosure in a lifted position.

With reference now to the drawings, and in particular to FIGS. 1 through 7 thereof, a new adjustable seating device embodying the principles and concepts of an embodiment of the disclosure and generally designated by the reference numeral 10 will be described.

As best illustrated in FIGS. 1 through 7, the adjustable seat system 10 generally comprises a pair of chairs 12. The chairs 12, 13 are aligned with each other so that a front side 14 of one chair 12 faces a backside 16 of another of the chairs 13. This orientation would typically be found on a passenger vehicle such as a train, bus or airplane.

Each of the chairs 12, 13 includes a seat 18 that has a plurality of legs 20 attached thereto and extending downwardly therefrom. The seat 18 includes a pair of lateral walls 22 and seat cushion 24 that is positioned between the lateral walls 22. The seat cushion 24 has a rear edge 26 and a front edge 28. The seat cushion 24 may be pivotally coupled to the lateral walls 22 by a pivot pin or other conventional structure. A backrest 32 has an upper edge 34 and a lower edge 36. The lower edge 36 is pivotally coupled to the seat cushion 24 adjacent to the rear edge 26.

A pair of side walls 38 is provided. Each of the lateral walls 22 has one of the side walls 38 attached thereto. Each of the side walls 38 extends upwardly from the seat 18. The backrest 32 is positioned between the side walls 38 and is coupled to the side walls 38. The backrest 32 may include a coupler 40 positioned in guides 42 to retain the backrest 32 in sliding connection with the side walls 38.

Figure 6:
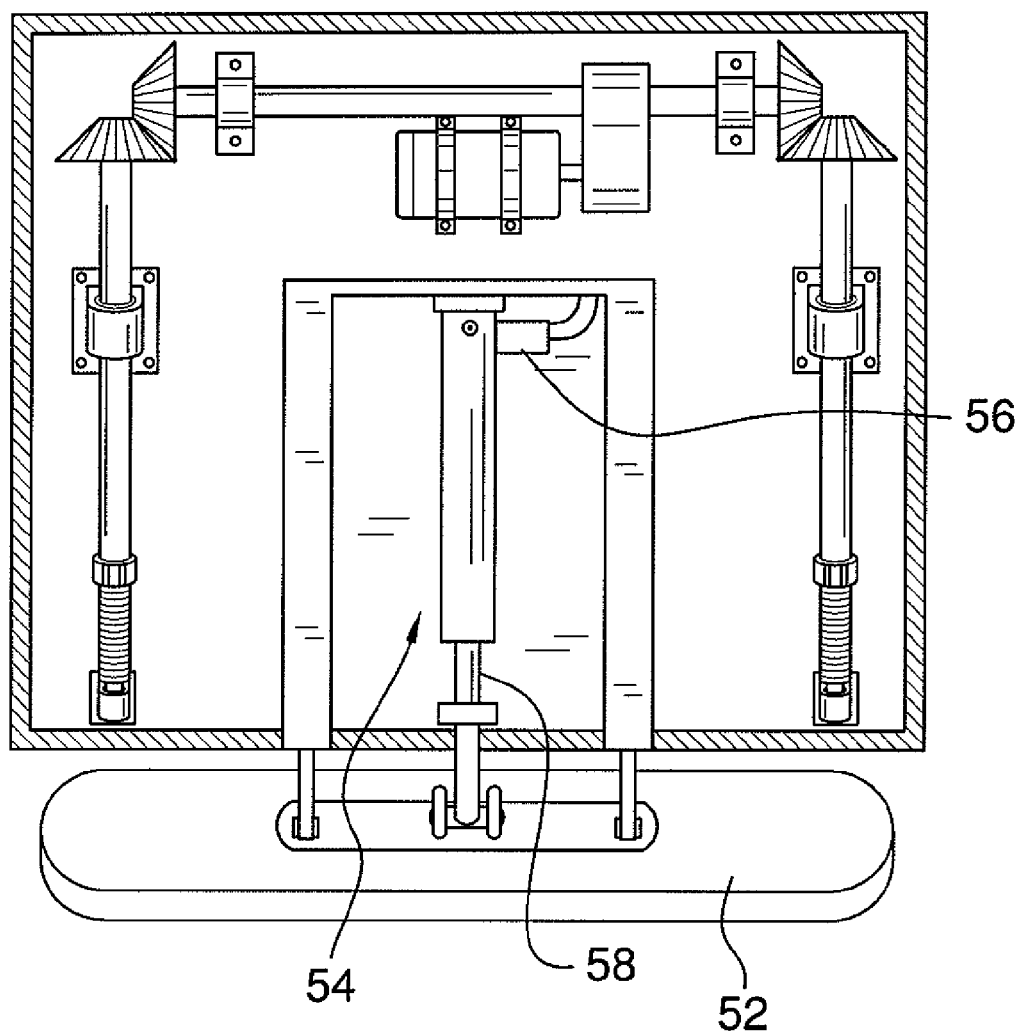
FIG. 6 is a cross-sectional view taken along line 6-6 of FIG. 5b of an embodiment of the disclosure.
Figure 7:
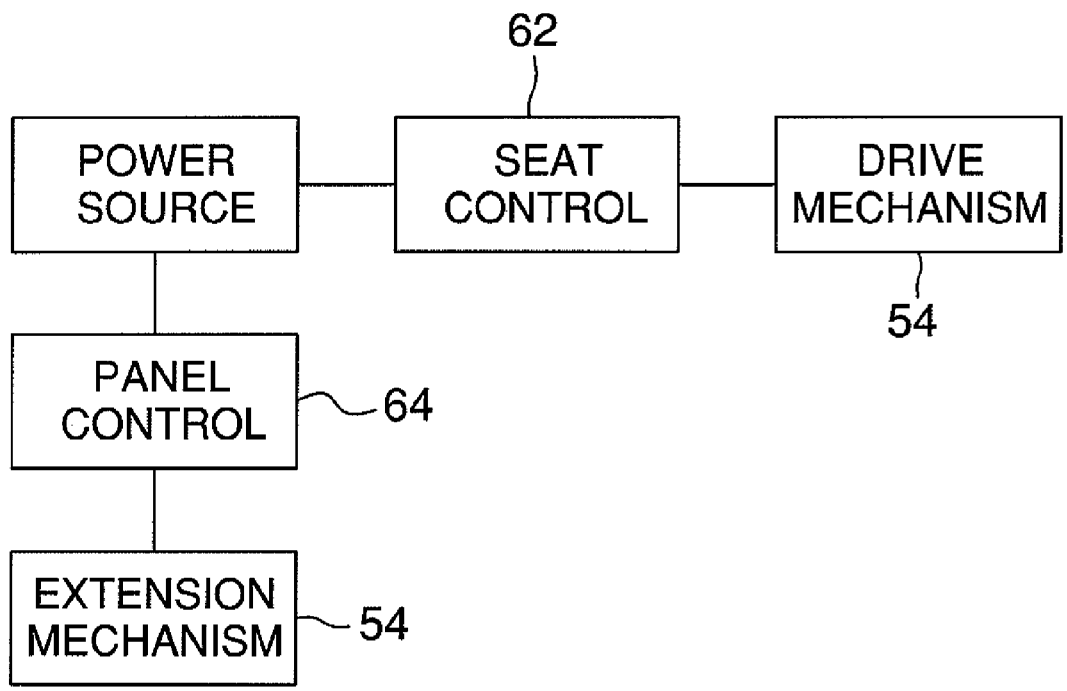
FIG. 7 is a schematic view of an embodiment of the disclosure.

A drive mechanism 44 is mounted to the seat 18 and is mechanically coupled to the seat cushion 24. The drive mechanism 44 is actuated in a first direction to lift the rear edge 26 upwardly with respect to the lateral walls 22 and the upper edge 34 with respect to the side walls 38. The drive mechanism 44 is actuated in a second direction to lower the rear edge 26 downwardly to an approximately horizontal orientation. The drive mechanism 44 includes a motor 46 mechanically coupled to a worm gear 48 which is threadably coupled to a jack 50. When the seat cushion 24 is lifted to its fullest extent, the angle formed between the seat cushion 24 and backrest 32 is between 130° degrees and 170° degrees. As shown in FIG. 6, a pair of worm gears 48 and jacks 50 may be utilized.

A shin engaging panel 52 is attached to the backside 16 of the seat 18. The shin engaging panel 52 is pivotable with respect to the seat 18. The shin engaging panel 52 may be padded with a resiliently compressible material. An extension mechanism 54 is attached to the shin engaging panel 52. The extension mechanism 54 extends the shin engaging panel 52 away from the seat 18 in a deployed position or retracting the shin engaging panel against the seat 18 in a stored position. The extension mechanism 54 may include a pump 56 and pneumatic or hydraulic piston 58 combination. The shin engaging panel 52 may include stabilizing rods 60 slidably coupled to the seat 18.

A seat control 62 is electrically coupled to the drive mechanism 44 and is actuated to selectively actuate the drive mechanism 44 in a first direction or a second direction. A panel control 64 is electrically coupled to the extension mechanism 54 to actuate the extension mechanism 54 to the deployed position or the stored position. The seat 62 and panel 64 controls may be positioned on armrests attached to the chair 12 or 13.

In use, the chairs 12, 13 are used in a conventional manner. However, during a long travel period, a person seated in the chair 12 or 13 can raise the seat cushion 24 and extend the shin panel 52 to support the person in an angle which will relieve strain on the person's back, legs and buttocks.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An adjustable seating system comprising:
   a pair of chairs, said chairs being aligned with each other so that a front side of one chair faces a backside of another of the chairs, each of said chairs including;
      a seat having a plurality of legs being attached thereto and extending downwardly therefrom, said seat including a pair of lateral walls and a seat cushion being positioned between said lateral walls, said seat cushion having a rear edge and a front edge;
      a backrest being attached to said seat;
      a drive mechanism being mounted to said seat and being mechanically coupled to said seat cushion, said drive mechanism being actuated in a first direction to lift said rear edge upwardly with respect to said lateral walls and to angle with respect to a horizontal plane said seat such that said seat is angled downwardly from said rear edge to said front edge, said drive mechanism being actuated in a second direction to lower said rear edge downwardly to an approximately horizontal orientation;
      a seat control being electrically coupled to said drive mechanism and being actuated to selectively actuate said drive mechanism in a first direction or a second direction;
      a shin engaging panel being attached to the backside of said seat, said shin engaging panel being pivotable with respect to said seat;
      an extension mechanism being attached to said shin engaging panel, said extension mechanism being fully positioned rearwardly of an outermost face of said shin engaging panel relative to said seat, said extension mechanism selectively extending said shin engaging panel away from said seat into a deployed position and retracting said shin engaging panel against said seat into a stored position; and
      a panel control being electrically coupled to said extension mechanism to actuate said extension mechanism to the deployed position or the stored position.

2. The system according to claim 1, wherein each of said chairs further includes said backrest being pivotally coupled to said seat cushion adjacent to said rear edge, said drive mechanism lifting an upper edge of said backrest when said seat cushion is lifted.

3. The system according to claim 1, wherein each of said chairs further includes:
   a pair of side walls, each of said lateral walls having one of said side walls attached thereto, each of said side walls extending upwardly from said seat, said backrest being positioned between said side walls and being coupled to said side walls.

4. An adjustable seating system comprising:
   a pair of chairs, said chairs being aligned with each other so that a front side of one chair faces a backside of another of the chairs, each of said chairs including;
      a seat having a plurality of legs being attached thereto and extending downwardly therefrom, said seat including a pair of lateral walls and a seat cushion being positioned between said lateral walls, said seat cushion having a rear edge and a front edge;
      a backrest having an upper edge and a lower edge, said lower edge being pivotally coupled to said seat cushion adjacent to said rear edge;
      a pair of side walls, each of said lateral walls having one of said side walls attached thereto, each of said side walls extending upwardly from said seat, said backrest being positioned between said side walls and being coupled to said side walls;
      a drive mechanism being mounted to said seat and being mechanically coupled to said seat cushion, said drive mechanism being actuated in a first direction to lift said rear edge upwardly with respect to said lateral walls and said upper edge with respect to said side walls and to angle with respect to a horizontal plane said seat such that said seat is angled downwardly from said rear edge to said front edge, said drive mechanism being actuated in a second direction to lower said rear edge downwardly to an approximately horizontal orientation;
      a shin engaging panel being attached to the backside of said seat, said shin engaging panel being pivotable with respect to said seat;
      an extension mechanism being attached to said shin engaging panel, said extension mechanism being fully positioned rearwardly of an outermost face of said shin engaging panel relative to said seat, said extension mechanism selectively extending said shin engaging panel away from said seat into a deployed position and retracting said shin engaging panel against said seat into a stored position;
      a seat control being electrically coupled to said drive mechanism and being actuated to selectively actuate said drive mechanism in a first direction or a second direction; and
      a panel control being electrically coupled to said extension mechanism to actuate said extension mechanism to the deployed position or the stored position.

* * * * *